(12) United States Patent
Kim et al.

(10) Patent No.: US 6,975,379 B2
(45) Date of Patent: Dec. 13, 2005

(54) LIQUID CRYSTAL DISPLAY PANEL AND METHOD OF FABRICATING THE SAME

(75) Inventors: Jeong Hyun Kim, Kyounggi-do (KR); Jae Hong Jun, Seoul (KR)

(73) Assignee: LG.Philips LCD Co., LTD, Seoul (KR)

( * ) Notice: Subject to any disclaimer, the term of this patent is extended or adjusted under 35 U.S.C. 154(b) by 122 days.

(21) Appl. No.: 10/745,653

(22) Filed: Dec. 29, 2003

(65) Prior Publication Data

US 2004/0263764 A1    Dec. 30, 2004

(30) Foreign Application Priority Data

Jun. 24, 2003 (KR) .................... 10-2003-0041117

(51) Int. Cl.$^7$ .................... G02F 1/1333; G02F 1/1339
(52) U.S. Cl. .................... 349/155; 349/106; 349/110; 349/122; 349/156; 349/141; 349/187
(58) Field of Search .................... 349/43, 106, 110, 349/111, 141, 187, 122, 138, 155, 156, 123

(56) References Cited

U.S. PATENT DOCUMENTS 6,423,385 B1 *  7/2002  Kagawa et al. .............. 428/1.1
6,583,846 B1 *  6/2003  Yanagawa et al. .......... 349/155

* cited by examiner

*Primary Examiner*—Dung T. Nguyen
*Assistant Examiner*—Tai Duong
(74) *Attorney, Agent, or Firm*—Birch, Stewart, Kolasch & Birch, LLP

(57) ABSTRACT

A liquid crystal display panel and a fabricating method thereof are capable of lowering the manufacturing costs by reducing the amount of material and the number of masks, and also of making spacers at locations which are desired. The liquid crystal display panel includes: a black matrix formed on a first substrate; a color filter having a first through-hole for exposing the black matrix to the regions partitioned by the black matrix; a planarization layer having a second through-hole overlapped with the first through-hole; and a spacer formed at the first and second through-holes.

23 Claims, 30 Drawing Sheets

FIG.5I
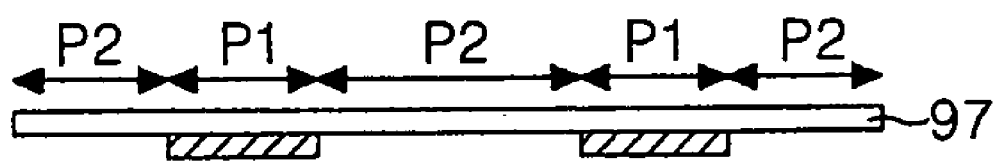
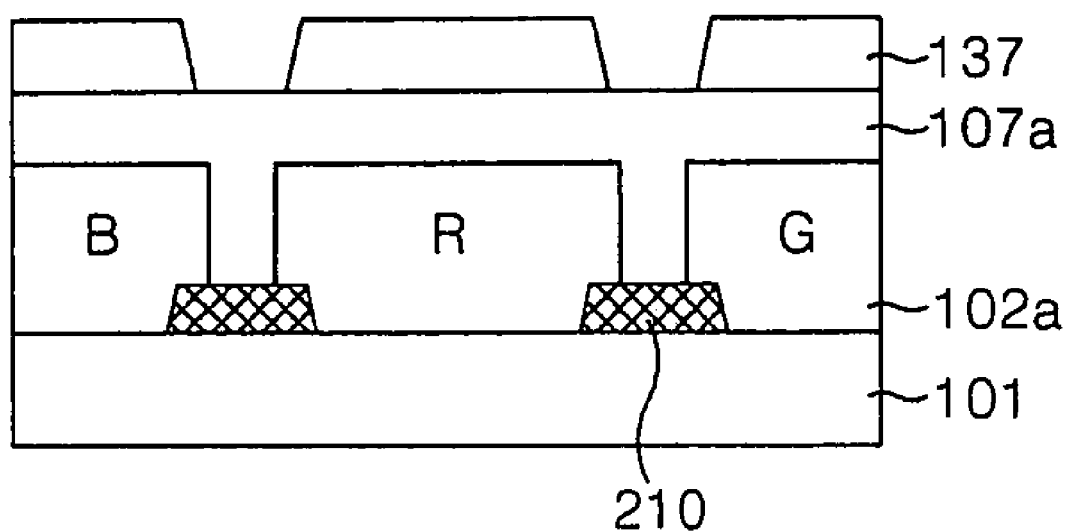

LIQUID CRYSTAL DISPLAY PANEL AND METHOD OF FABRICATING THE SAME

This application claims the benefit of the Korean Application P2003-41117 filed on Jun. 24, 2003, which is hereby incorporated by reference.

BACKGROUND OF THE INVENTION

1. Field of the Invention

The present invention relates to a liquid crystal display panel, and more particularly to a liquid crystal display panel and a fabricating method thereof that are capable of simplifying the manufacturing process of an upper substrate by reducing the number of masks and also simplifying the manufacturing process of making spacers at desired locations.

2. Description of the Background Art

Generally, a liquid crystal display (LCD) controls the light transmittance of liquid crystal cells in response to video signals to thereby display a picture corresponding to the video signals on a liquid crystal display panel. To this end, the LCD includes a liquid crystal display panel having liquid crystal cells arranged in an active matrix form, and driving circuits for driving the liquid crystal panel.

LCDs are generally classified into two modes, according to the direction of the electric field driving the liquid crystal—a twisted nematic (TN) mode using a vertical electric field and an in-plane switching (IPS) mode using a horizontal electric field. LCDs of TN mode drive the liquid crystal by the vertical electric field formed between the common electrode and the pixel electrode facing the upper substrate. LCDs of TN mode have the advantage of high aperture ratios, but have the disadvantage of narrow viewing angles. LCDs of IPS mode drive the liquid crystal by the horizontal electric field formed between the pixel electrode and the common electrode located in parallel on the lower substrate. LCDs of IPS mode have the advantage of wide viewing angles, but have the disadvantage of low aperture ratios.

FIG. 1 is a cross-sectional view illustrating an IPS mode liquid crystal display panel of the background art.

Referring to FIG. 1, the IPS Mode liquid crystal display panel includes: an upper plate having a black matrix 2, a color filter 6, a planarization layer 7, a pattern spacer 13, and an upper alignment layer 8, which are sequentially formed on an upper substrate 1 a rear surface of which is covered with materials (not shown) forming a transparent electrode for preventing static electricity; a lower plate having a thin film transistor (TFT), a common electrode 4, a pixel electrode 9, and a lower alignment layer 10, which are respectively formed on a lower substrate 5; and a liquid crystal(not shown) injected into the inner space between the upper and the lower plates.

In the upper plate, the black matrix 2 is formed so as to overlap with the area of the TFT on the lower substrate 5 and with the area (not shown) of gate and data lines, and partitions the cell regions at which the color filter 6 is to be formed. The black matrix 20 functions to prevent light leakage and absorb external light, to thereby improve the contrast ratio. The color filter 6 is formed so as to encompass the cell region partitioned by the black matrix 2. The color filter 6 is formed by separate red (R), green (G), and blue (B) filters and realizes red, green, and blue colors. The planarization layer 7 is formed to cover the color filter and planarizes the upper substrate 1. The patterned spacer 13 maintains the cell gap between the upper substrate 1 and the lower substrate 5.

In the lower plate, the TFT includes: a gate electrode 16 along with a gate line (not shown) formed on the lower substrate 5; semiconductor layers 126 and 127 formed to overlap with the gate electrode 16 and a gate insulating layer 129 therebetween; and source/drain electrodes 128 and 130 formed along with a data line (not shown) on both the semiconductor layers 126 and 127 therebetween. In response to scan signals from the gate line, this TFT supplies pixel signals from the data line to the pixel electrode 9. The pixel electrode 9 is made from transparent conductive materials with high light transmittance, and makes contact with the drain electrode 130 of the TFT through a protective film 25. The common electrode 4 is formed in a stripe form so as to alternate with the pixel electrode 9. A common voltage, the reference to the drive of the liquid crystal, is applied to the common electrode 4. The horizontal electric field formed by this common voltage and the voltage supplied to the pixel electrode 9 makes the liquid crystal rotate horizontally. The upper and lower alignment layers 8, 10 for aligning the liquid crystal are formed through a two-stage process which includes application of alignment materials such as polyimide, which is then followed by rubbing.

FIGS. 2a to 2f are cross-sectional views illustrating the steps for fabricating the upper substrate adopting the IPS mode.

Referring to FIG. 2a, opaque materials such as nontransparent metal or nontransparent resin are deposited on the upper substrate 1. Then, the nontransparent materials are patterned through a photolithography process and an etching process using a first mask. Consequently, black matrixes 2 are formed.

Referring to FIG. 2b, red resin (R) is deposited on the upper substrate 1 having the black matrix formed thereon. Then, the red resin (R) is patterned through a photolithography process and an etching process using a second mask. Consequently, a red color filter (3R) is formed.

Referring to FIG. 2c, green resin (G) is deposited on the upper substrate 1 having the red color filter (3R) formed thereon. Then, the green resin (G) is patterned through a photolithography process and an etching process using the third mask. Consequently, a green color filter (3G) is formed.

Referring to FIG. 2d, blue resin (B) is deposited on the upper substrate 1 having the green color filter (3G) formed thereon. Then, the blue resin (G) is patterned through a photolithography process and an etching process using a fourth mask. Consequently, a blue color filter (3B) is formed.

Referring to FIG. 2e, planarization materials are deposited on the entire surface of the upper substrate 1 having the red, green, and blue color filters (6) formed thereon. Consequently, the planarization layer 7 is formed.

Referring to FIG. 2f, spacer materials are deposited on the upper substrate 1 having the planarization layer 7 formed thereon. Then, the spacer materials are patterned through a photolithography process and an etching process using a fifth mask. Consequently, the pattern spacer is formed. In this process, organic materials are used for the spacer material.

The pattern spacer 13 of the background art LCD occupies about 2% of the area of the upper substrate 1. More than 95% of the spacer material that has been printed on the entire surface of the upper substrate 1 to form the pattern spacer 13 is removed during the processes of exposure, development, and etching. As a result, the cost of materials is high and the fabrication costs are high. Further, the mask process for forming the pattern spacer 13 includes a plurality of sub-processes such as deposition, cleaning, photolithography, etching, stripping, and inspection. This complex fabricating process leads to the problem of increases in the manufacturing costs of a background art liquid crystal panel.

In order to solve the problems mentioned, an ink-jet device is used to make spacers as shown in FIG. 3a and FIG. 3b.

First of all, as shown in FIG. 3a, an ink-jet device 40 is aligned on the upper substrate 1 having the planarization layer formed thereon, wherein the planarization layer is overlapped with the position of the black matrix 2. Then, the spacer material 26a is jetted to the planarization layer 7 from the ink-jet device 40. Here, organic materials are used for the spacer material. The spacer 55 formed through this ink-jet device thereafter undergoes an exposure to ultraviolet radiation from a light source 59 or a firing process as shown in FIG. 3b, resulting in the width (W) and height (H) as shown.

During the formation of the spacer using the background art ink-jet device, the spacer material (of low viscosity) is subjected to gravity while being jetted to the planarization layer 7. Due to gravity, the spacer material spreads out widely on the planarization layer 7 upon being applied thereto. This causes a problem in which spacers are formed at undesirable locations, that is, locations which do not overlap with the black matrix 2 such as the display areas.

SUMMARY OF THE INVENTION

Accordingly, an object of the present invention is to provide a liquid crystal display panel and a fabricating method thereof that are capable of lowering manufacturing costs by reducing the amount of material and the number of masks, and also of making spacers at desired locations.

In order to achieve these objects of the invention, according to one aspect of the present invention, a liquid crystal display panel includes: a black matrix formed on a first substrate; a color filter having a first through-hole for exposing the black matrix to the region partitioned by the black matrix; a planarization layer having a second through-hole overlapping with the first through-hole; and a spacer formed at the first and second through-holes.

The height or thickness of the spacer is in a range of approximately 2~5 μm.

The first through-hole has a depth (or height) in the range of 1~2 μm and a cross-sectional area or width in the range of approximately 10~70 μm.

The width of the second through-hole is greater than or equal to the width of the first through-hole.

The liquid crystal display panel further includes: a lower substrate facing the upper substrate; a pixel electrode formed on the lower substrate; and a common electrode producing a horizontal electric field together with the pixel electrode.

According to the present invention, a method of fabricating a liquid crystal display panel includes steps of: forming a black matrix on an upper substrate; forming a color filter having a first through-hole for exposing the black matrix; forming a planarization layer having a second through-hole overlapping with the first through-hole; and forming a spacer positioned within the upper and the second through-holes, overlapped with the black matrix, and projected from the planarization layer.

The spacer has a height in the range of 2~5 μm.

The first through-hole has a height in the range of 1~2 μm and a width in the range of 10~70 μm.

The width of the second through-hole is greater than or equal to the width of the first through-hole.

The spacer is formed using an ink-jet method.

The method of fabricating a liquid crystal display panel further includes steps of: forming a lower substrate facing the upper substrate; forming a pixel electrode on the lower substrate; and forming a common electrode providing a horizontal electric field together with the pixel electrode.

According to another aspect of the present invention, a method of fabricating a liquid crystal display panel includes steps of: forming a black matrix on a substrate; forming a color filter on the substrate having the black matrix formed thereon; forming a planarization layer covering the color filter and the black matrix; making a deep hole penetrating both the color filter and the planarization layer for exposing the black matrix; and forming a spacer within the deep hole, overlapped with the black matrix, and projected from the planarization layer.

BRIEF DESCRIPTION OF THE DRAWINGS

These objects and other advantages of the invention will be apparent from the following detailed description of embodiments of the present invention with reference to the accompanying drawings, in which:

FIGS. 5a to 5k are sectional views representing steps of a manufacturing process of an upper plate of the liquid crystal display panel of FIG. 4; and FIGS. 6a to 6i are sectional views representing steps of another manufacturing process of an upper plate of the liquid crystal display panel of FIG. 4.

DETAILED DESCRIPTION OF PREFERRED EMBODIMENTS

Hereinafter, embodiments of the present invention will be explained in detail with reference to accompanying FIGS. 4 to 6.

Figure 1:
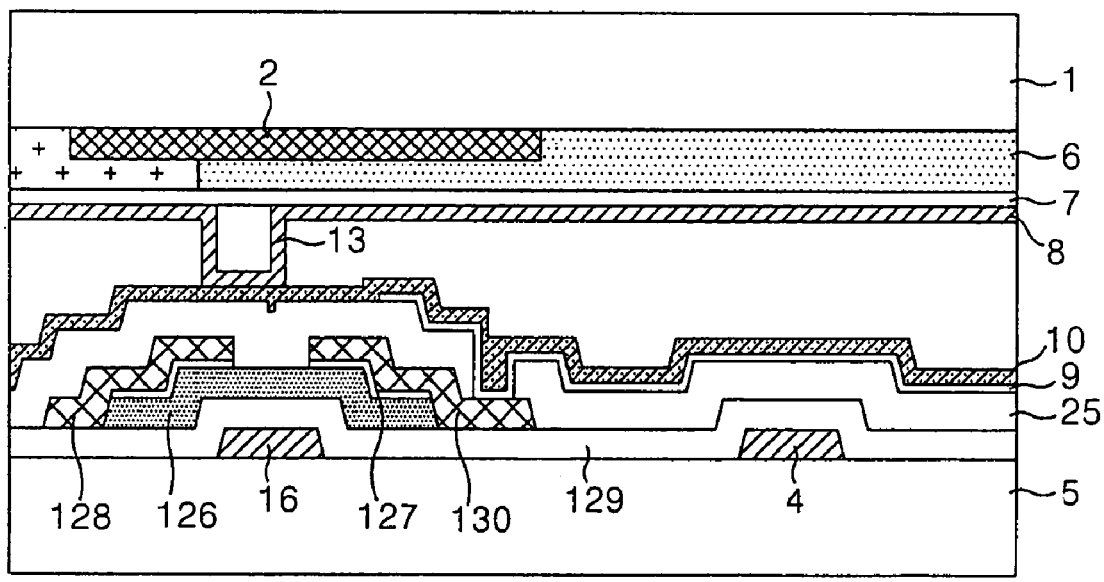
FIG. 1 is a cross-sectional view showing the structure of a background art liquid crystal display panel adopting the IPS mode.
Figure 2A:
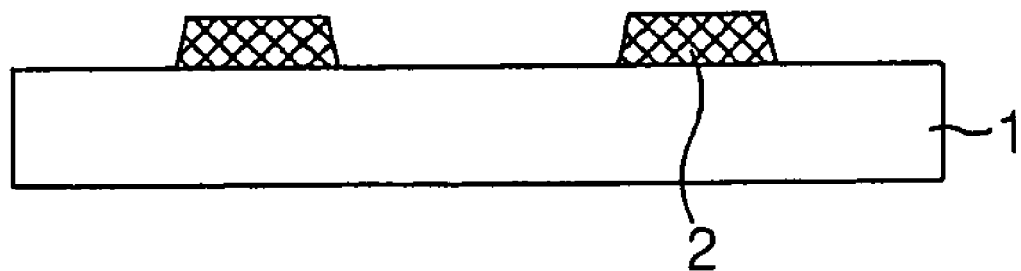
FIGS. 2a to 2f are sectional views representing a manufacturing process of an upper plate of the liquid crystal display panel of FIG. 1.
Figure 2B:
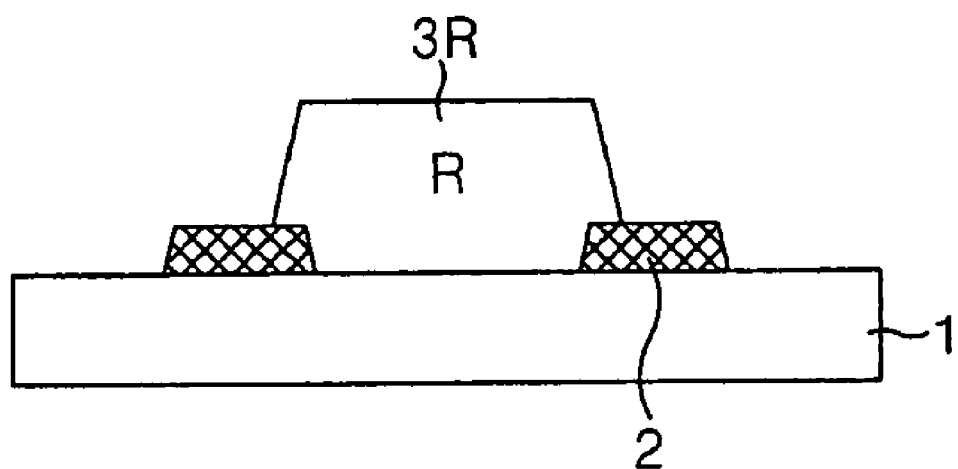
Figure 2C:
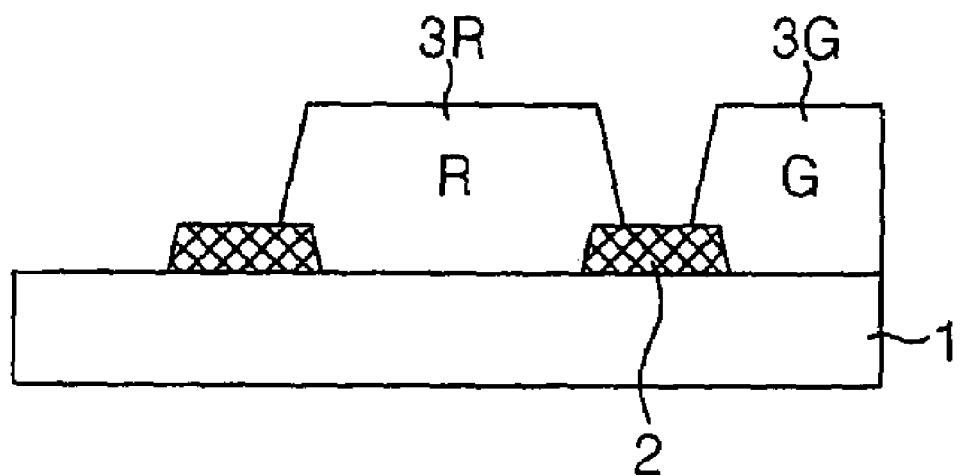
Figure 2D:
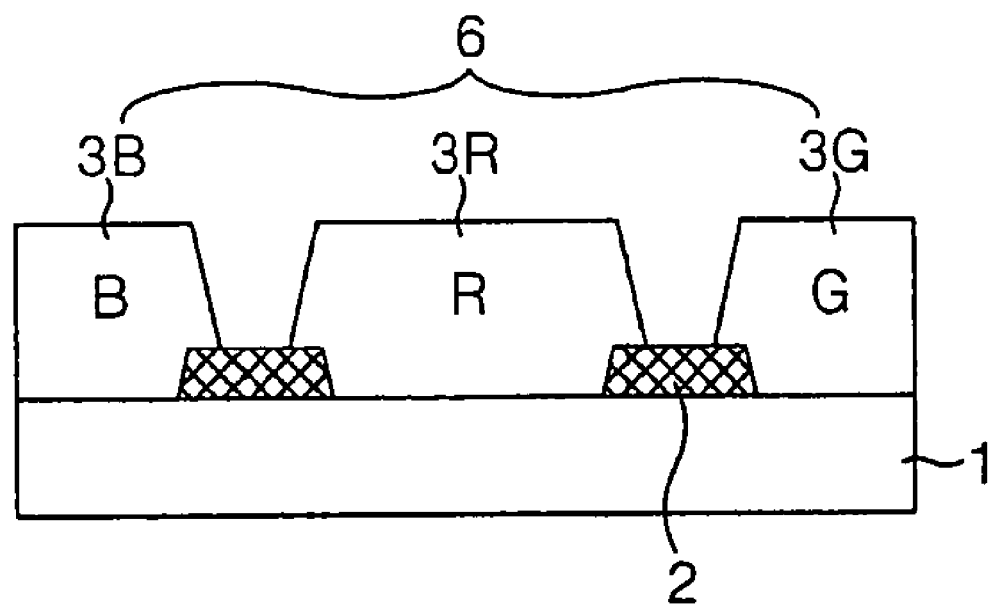
Figure 2E:
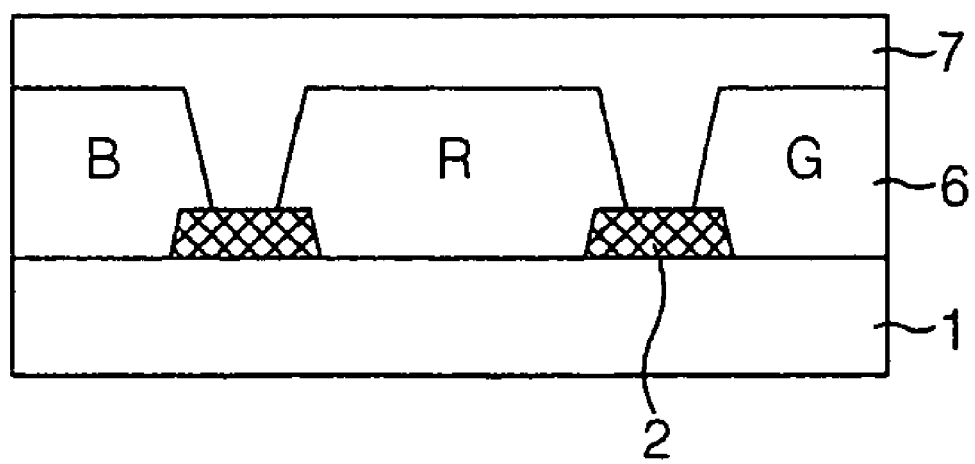
Figure 2F:
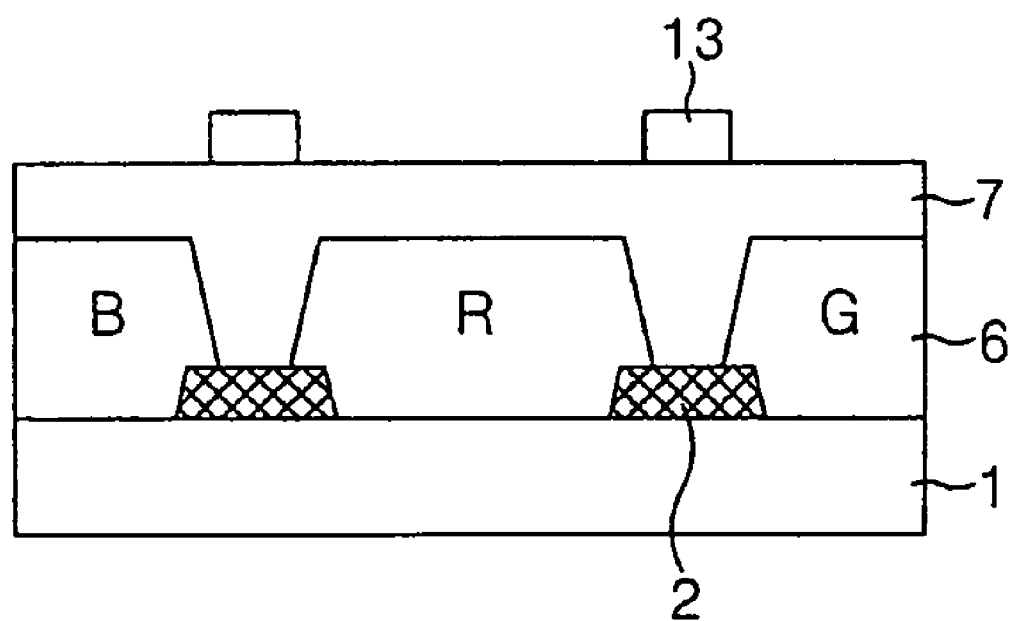
Figure 3A:
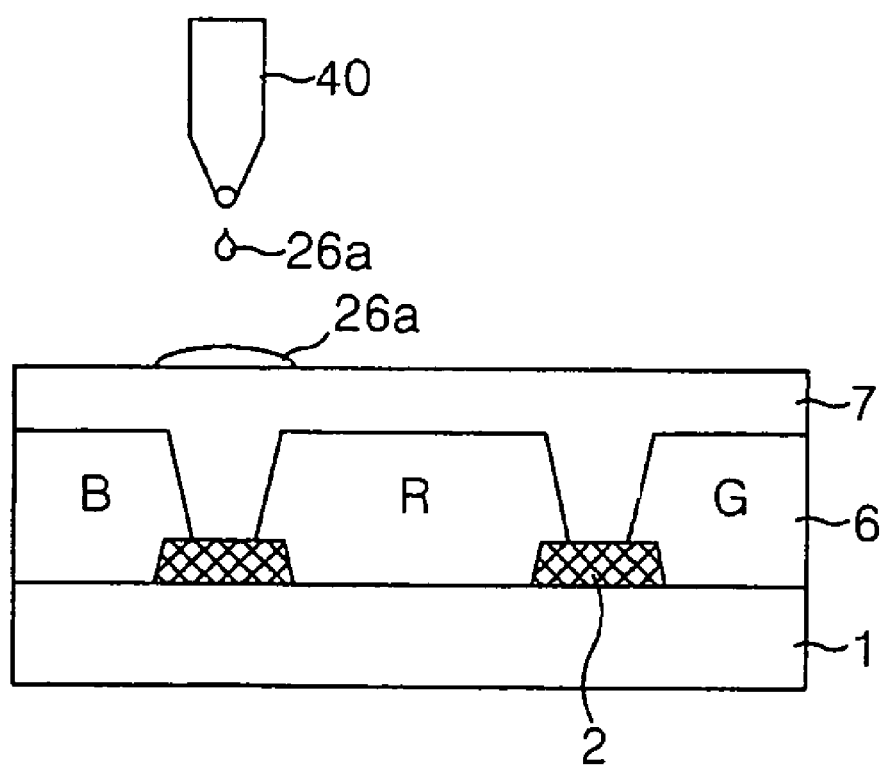
FIGS. 3a to 3b show a process of manufacturing a background art spacer using an ink-jet device.
Figure 3B:
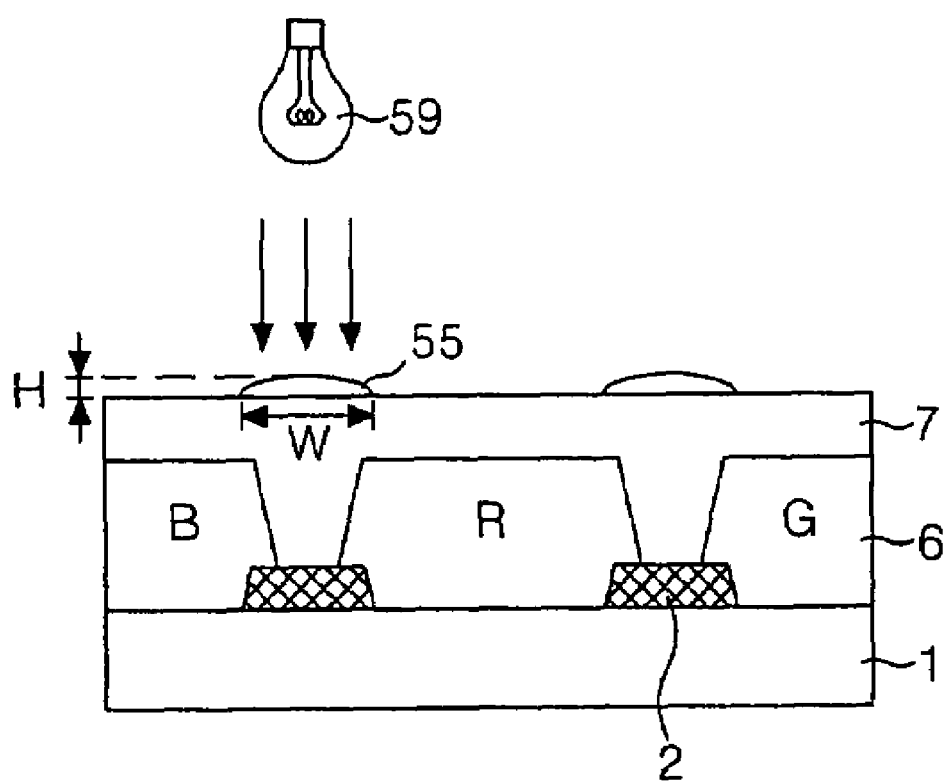
Figure 4:
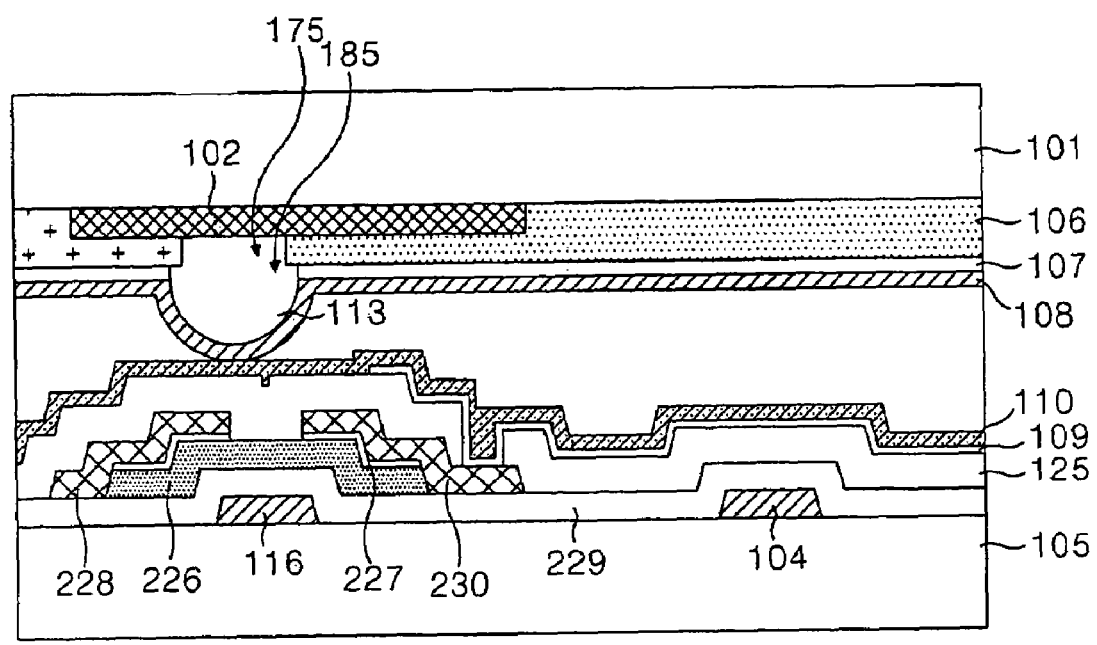
FIG. 4 is a cross-sectional view illustrating a liquid crystal display panel adopting the IPS mode according to an embodiment of the present invention.

FIG. 4 is a cross-sectional view illustrating a liquid crystal display panel adopting the IPS mode according to an embodiment of the present invention.

Referring to FIG. 4, an IPS mode liquid crystal display panel includes: an upper plate having a black matrix 102, a color filter 106, a planarization layer 107, a spacer 113, and an upper alignment layer 108, which are sequentially formed on an upper substrate 101 a rear surface of which is covered with materials (not shown) of a transparent electrode for preventing static electricity; a lower plate having a thin film transistor (TFT), a common electrode 104, a pixel electrode 109, and a lower alignment layer 110, which are formed on a lower substrate 105; and a liquid crystal (not shown) injected into the inner space between the upper and the lower plates.

In the upper plate, the black matrix 102 is formed so as to overlap with the area of the TFT on the lower substrate 105 and with the area (not shown) of gate lines and data lines, and partitions the cell regions at which the color filter 106 is to be formed. The black matrix 102 functions to prevent light leakage and absorb external light, to thereby improve the contrast ratio. The color filter 106 is formed so as to encompass the cell region partitioned by the black matrix 102. This color filter 106 is formed using separate red (R), green (G), and blue (B) filters and realizes red, green, and blue colors. The planarization layer 107 is formed to cover the color filter and planarizes the upper substrate 101.

The spacer 113 is formed so as to contact the black matrix 102 and be placed at first and second through-holes (175, 185) passing through both the color filter 106 and the planarization layer 107, and maintains the cell gap between the upper substrate 101 and the lower substrate 105.

The first through-hole 175 passes between the adjacent color filters 106 to expose a portion of the black matrix 102. The first through-hole 175 may be formed in the shape of a square or a circle. The height of the first through-hole 175 is equal to the height of the color filter 106 approximately (1~2 $\mu$m) and the width thereof is in the range of approximately 10~70 $\mu$m.

The second through-hole 185 passes through the planarization layer 107 and overlaps with the first through hole 175, to expose a portion of the black matrix 102. The width of the second through-hole 185 is greater than or equal to the width of the first through-hole 175.

In the lower plate, the TFT includes: a gate electrode 116 formed on the lower substrate 105 along with a gate line(not shown); semiconductor layers 226 and 227 formed to overlap with the gate electrode 116 and a gate insulating film 229 therebetween; and source/drain electrodes 228 and 230 formed along with a data line(not shown) on both the semiconductor layers 226 and 227 therebetween. In response to scan signals from the gate line, this TFT supplies pixel signals from the data line to the pixel electrode 109. The pixel electrode 109 is made from transparent conductive materials with high light transmittance, and contacts the drain electrode 230 of the TFT through a protective film 125. The common electrode 104 is formed in a stripe form so as to alternate with the pixel electrode 109. A common voltage, the reference to the drive of the liquid crystal, is applied to the common electrode 104. The horizontal electric field formed by this common voltage and the voltage supplied to the pixel electrode 109 causes the liquid crystal to rotate horizontally.

The upper and lower alignment layers 108, 110 or aligning the liquid crystal are formed through a two-stage process of application of alignment materials such as polyimide, that process being followed by rubbing.

FIGS. 5a to 5k are sectional views representing steps of a manufacturing process of an upper substrate of the liquid crystal display panel adopting the IPS mode.

Figure 5A:
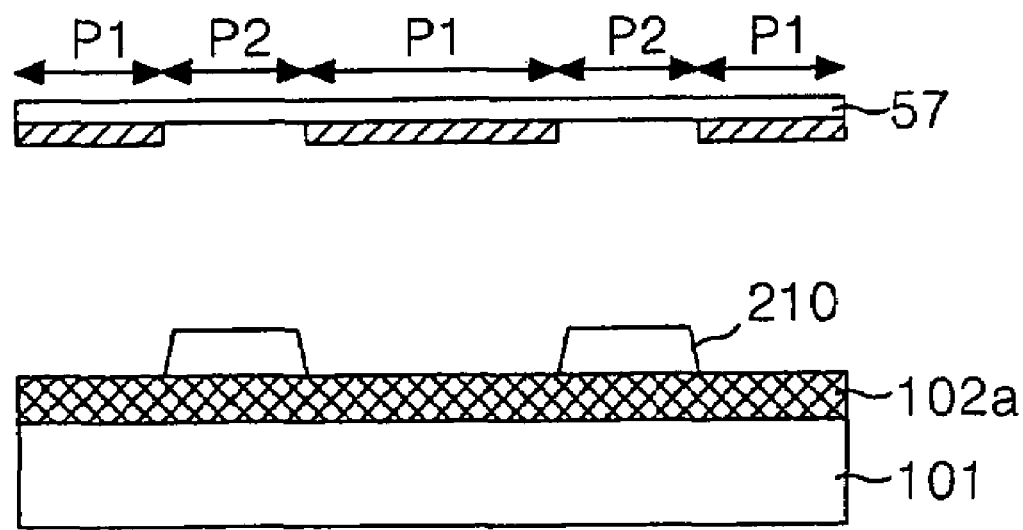
Figure 5B:
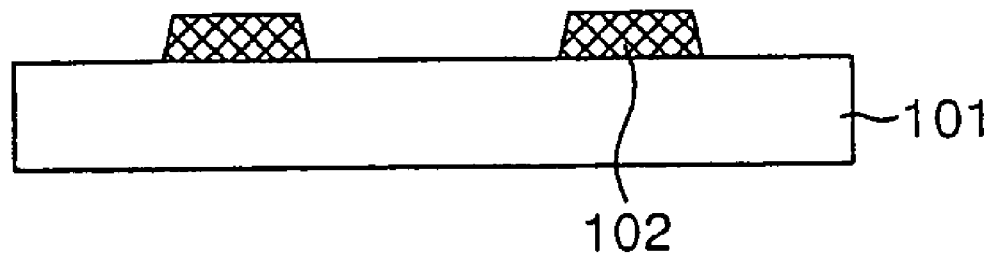

Referring to FIG. 5a, opaque material 102a such as nontransparent metal or nontransparent resin is deposited and then a photoresist is formed on the upper substrate 101. A mask 57 having a transmission part P2 and a shielding part P1 is aligned on the upper substrate 101 having the photoresist formed thereon. A photolithography process and an etching process using a mask 57 are applied to remove the portion of the photoresist shielded from the light with the shielding part P1, and maintain the portion of the photoresist exposed to the light via the transmission part P2, whereby a photoresist pattern 210 is formed. Next, the nontransparent material is patterned through an etching process using the photoresist pattern 210 as a mask, to thereby form the black matrix 102 as shown in FIG. 5b.

Figure 5C:
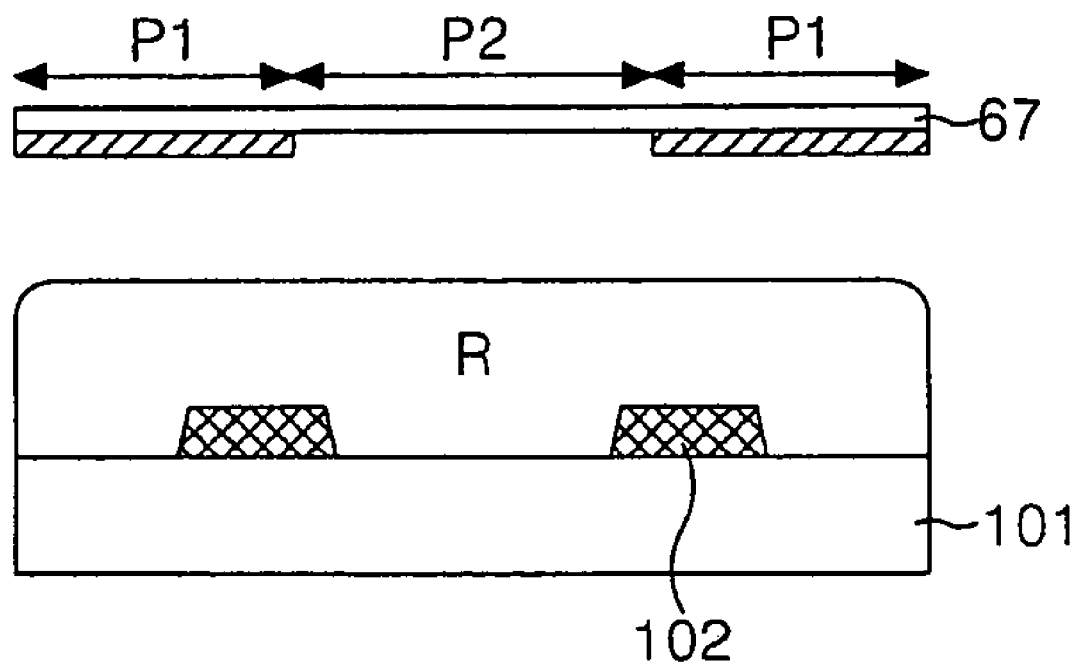
Figure 5D:
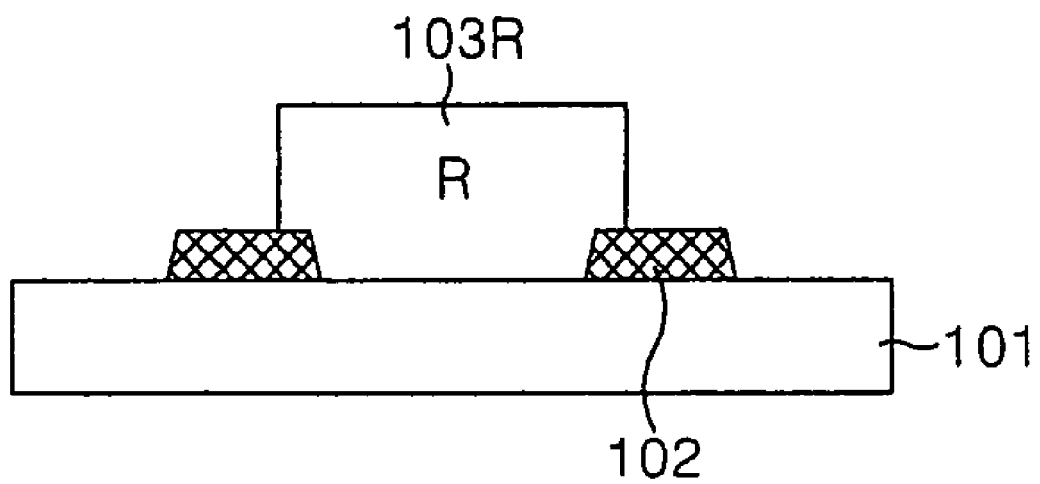

Referring to FIG. 5c, red resin (R) is deposited on the entire surface of the upper substrate 101 having the black matrix 102 formed thereon. A mask 67 having a transmission part P2 and a shielding part P1 is aligned on the upper substrate 101 having the red resin (R) deposited thereon. A photolithography process and an etching process using the mask 67 are applied to remove the portion of the red resin shielded from the light with the shielding part P1, and maintain the other portion of the red resin exposed to the light via the transmission part P2. As a result, a red color filter 103R is formed as shown in FIG. 5d. Here, a relatively small portion of the red color filter (103R) overlaps with the black matrix 102.

Figure 5E:
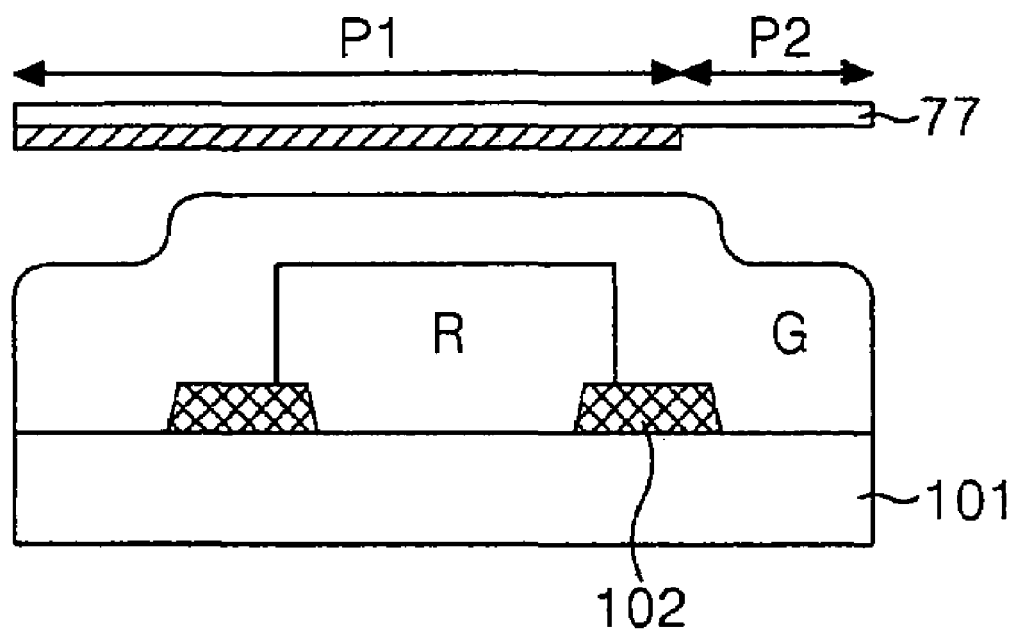
Figure 5F:
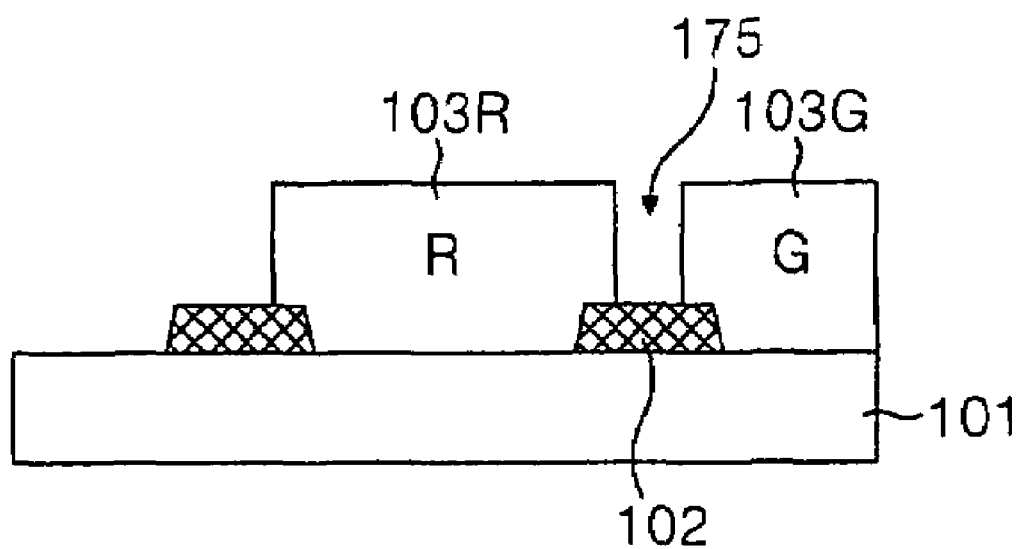

Referring to FIG. 5e, green resin (G) is deposited on the entire upper substrate 101 having the red color filter (103R) formed thereon. A mask 77 having a transmission part P2 and shielding part P1 is aligned on the upper substrate 101 having the green resin (G) deposited thereon. Photolithography and etching processes using the mask 77 are applied to remove the portion of the green resin shielded from the light with the shielding part P1, and maintain the other portion of the green resin exposed to the light via the transmission part P2. As a result, a green color filter 103G is formed as shown in FIG. 5f. Then, a first through-hole 175 is formed to expose the portion of the black matrix 102 between the red and the green color filters 103R and 103G.

Figure 5G:
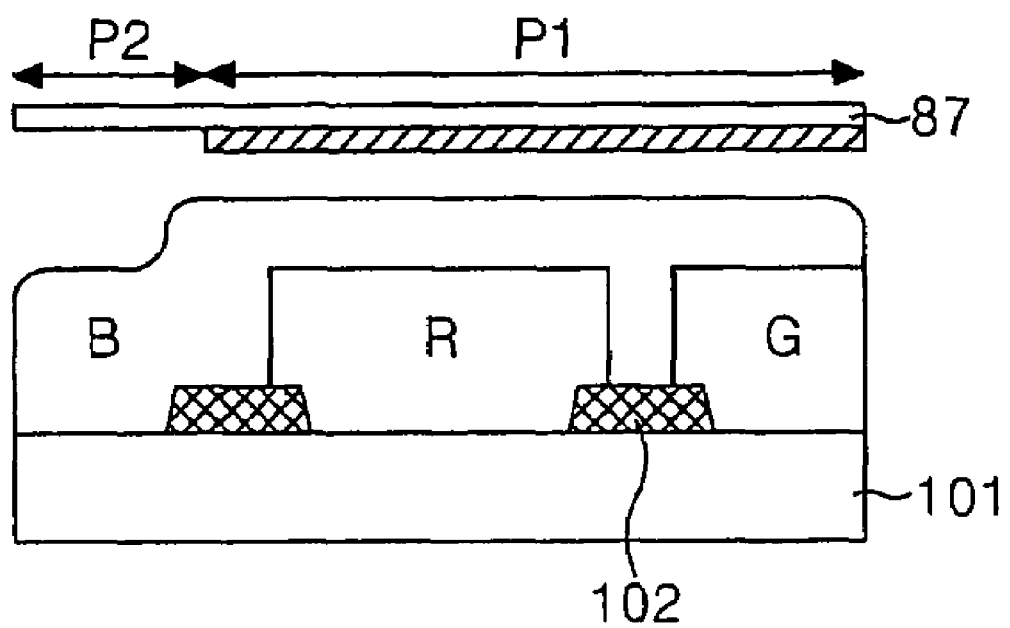
Figure 5H:
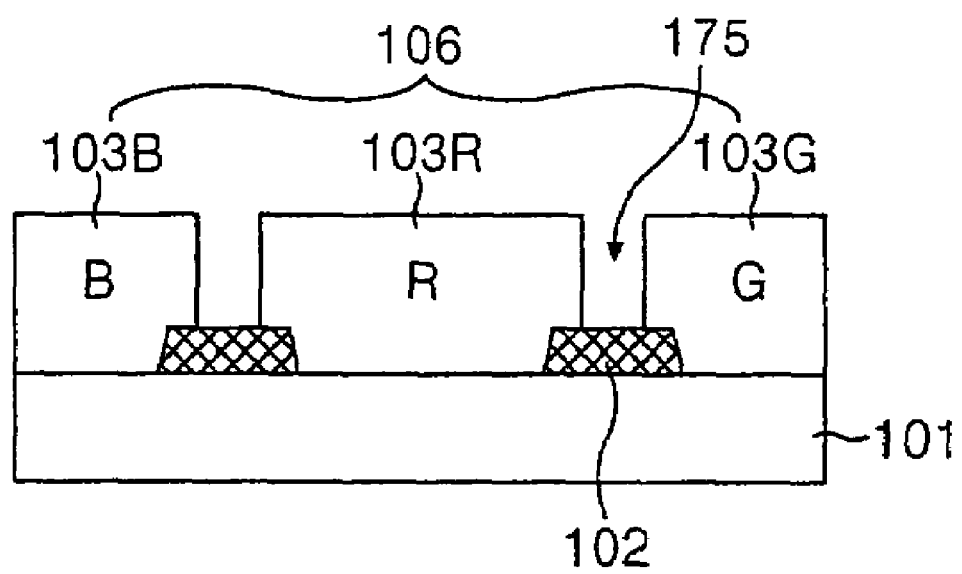

Referring to FIG. 5g, blue resin (B) is deposited on the entire surface of the upper substrate 101 having the green color filter (103G) formed thereon. A mask 87 having a transmission part P2 and a shielding part P1 is aligned on the upper substrate 101 having the blue resin (B) deposited thereon. Photolithography and etching processes using the mask 87 are applied to remove the portion of the blue resin shielded from the light with the shielding part P1, and maintain the other portion of the blue resin exposed to the light via the transmission part P2. As a result, a blue color filter (103B) is formed as shown in FIG. 5h. Then, the first through-holes 175 are formed to expose the portion of the black matrix 102 between the blue and green color filters 103B, 103G, and the portion of the black matrix 102 between the red and blue color filters 103R, 103B. Here, the shape of the first through-hole 175 may be square or circular, the height thereof being equal to the height of the blue color filter (103B) (1~2 $\mu$m), the width or cross-sectional area in a range of 10~70 $\mu$m.

Figure 5J:
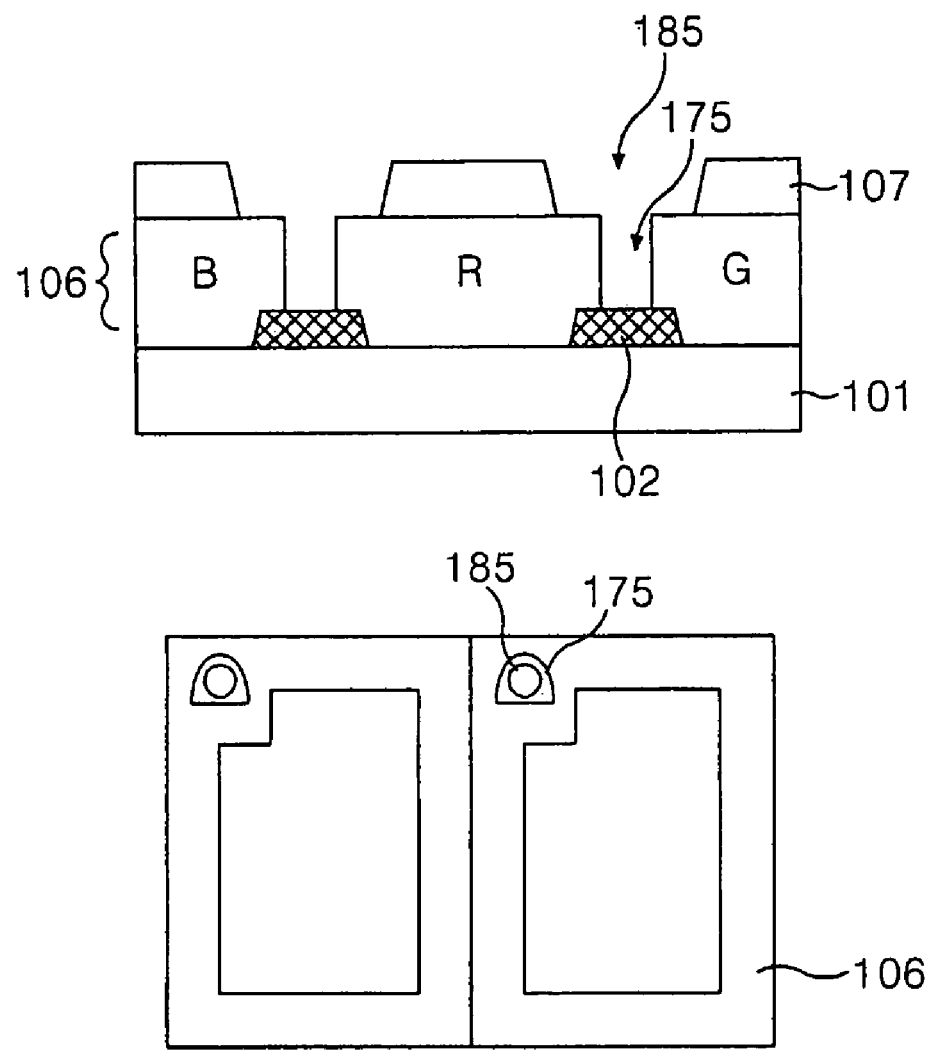

Referring to FIG. 5i, planarization material 107a and a photoresist are sequentially deposited on the upper substrate 101 having both the R, G, B color filters (106) and the first through-hole formed thereon. Acryl or acrylic resin is used for the planarization material 107a. A mask 97 having a transmission part P2 and a shielding part P1 is aligned on the upper substrate 101 having the photoresist deposited thereon. Photolithography and etching processes using the mask 97 are applied to remove the portion of the photoresist shielded from the light with the shielding part P1, and maintain the other portion of the photoresist exposed to the light via the transmission part P2. As a result, a photoresist pattern 137 is formed. Next, the planarization material 107a is patterned through an etching process using the photoresist pattern 137 as a mask. As shown in FIG. 5j, the second through-hole 185 is formed to expose the black matrix via the planarization layer 107. Here, the shape of the second through-hole 185 may be square or circular, having a width greater than or equal to the width of the first through-hole 175. In fact, the cross-sectional shapes of the first and second through-holes 175 and 185 can have any desired configuration or shape. However, it is preferred that the area defined by the second through-hole 185 is greater than or equal to the area defined by the first through-hole 175, so that the area defined by the first through-hole 175 is completely within the overlap of the area defined by the second through-hole 185.

Figure 5K:
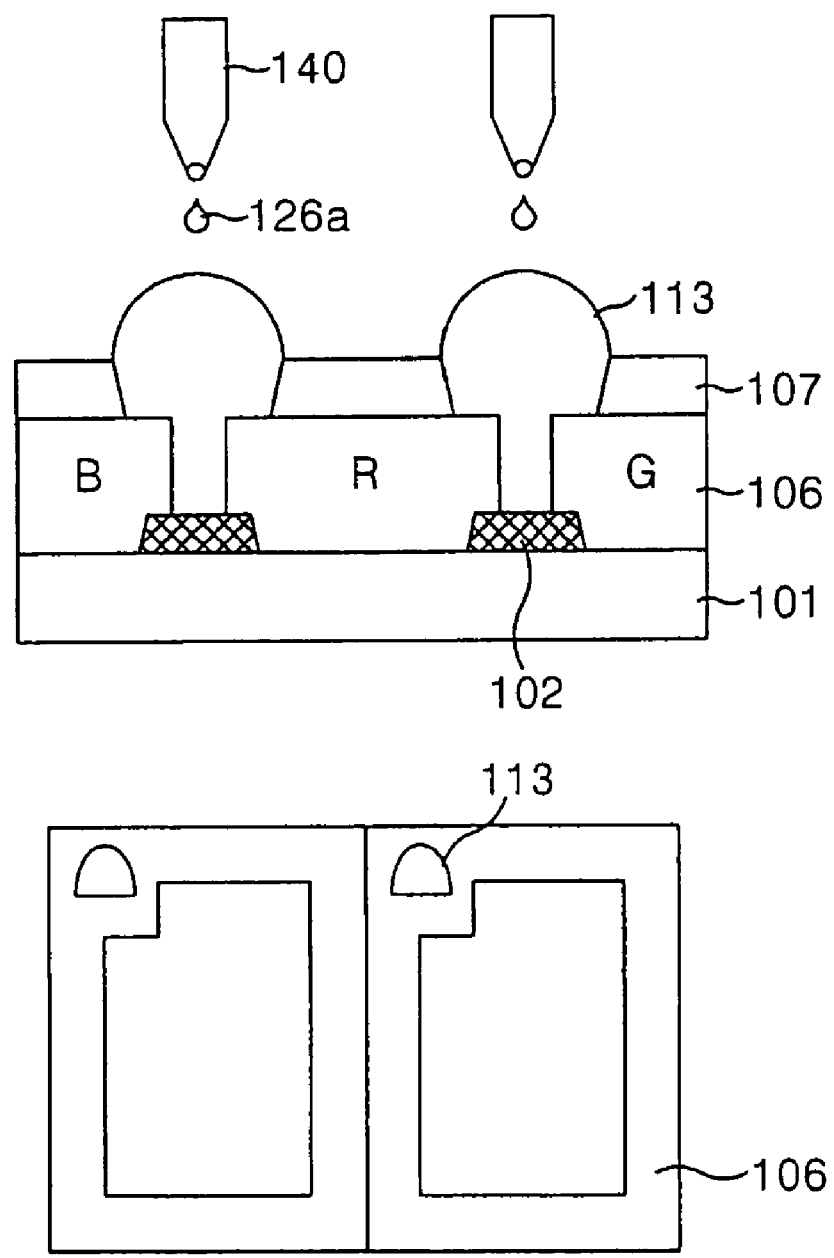

Referring to FIG. 5k, an ink-jet device is used to form the spacer 113 by injecting the spacer material 126a onto the upper and second through-holes 175 and 185. Here, the height of the spacer 113 is in a range of approximately 2~5 μm. Organic materials are used for the spacer material.

FIGS. 6a to 6i are sectional views representing steps of another manufacturing process of an upper substrate of the liquid crystal display panel adopting the IPS mode according to the present invention.

Figure 6A:
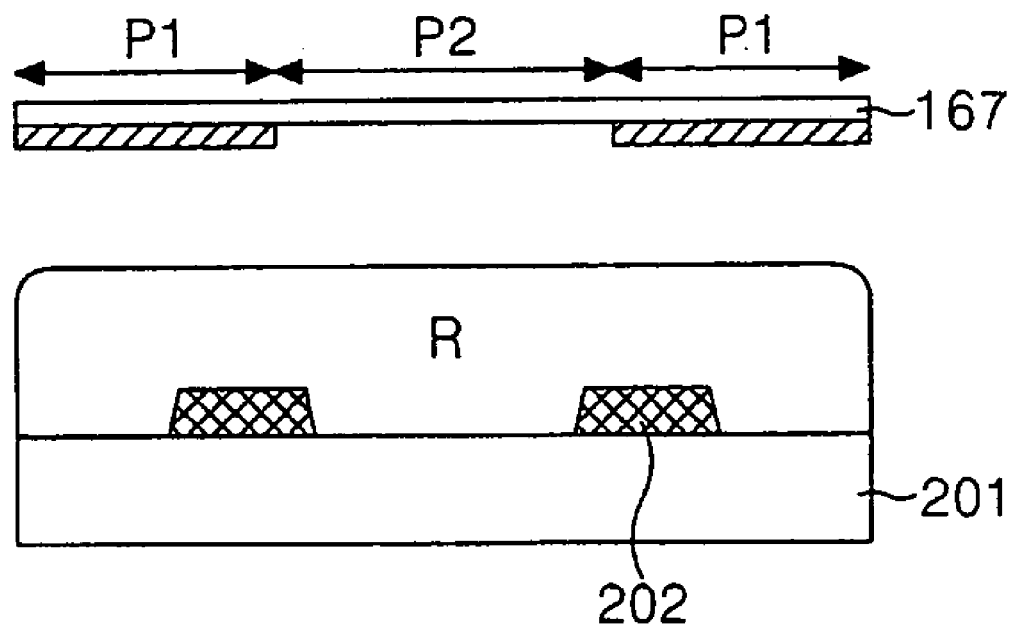
Figure 6B:
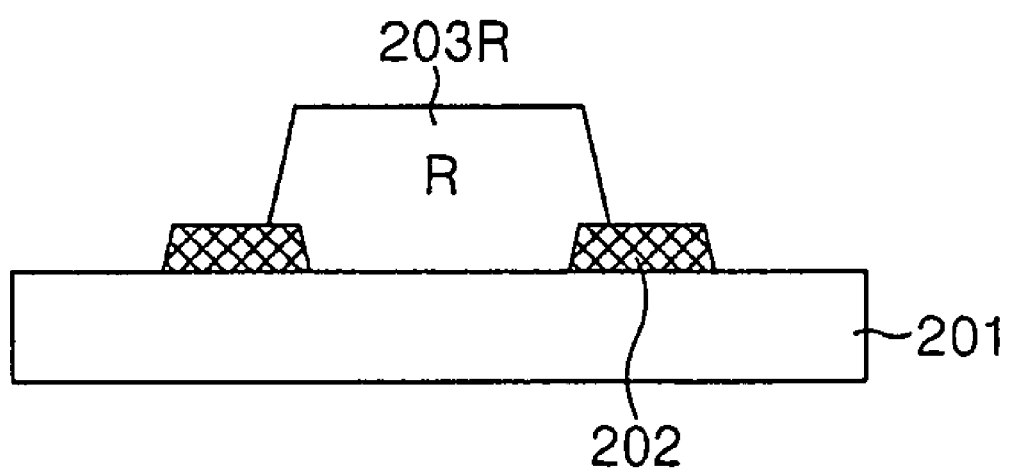

Referring to FIG. 6a, red resin (R) is deposited on the entire surface of the upper substrate 201 having the black matrix 202 formed thereon. A mask 167 having a transmission part P2 and a shielding part P1 is aligned on the upper substrate 201 having the red resin (R) deposited thereon. Photolithography and etching processes using the mask 167 are applied to remove the portion of the red resin shielded from the light with the shielding part P1, and maintain the other portion of the red resin exposed to the light via the transmission part P2. As a result, a red color filter 203R is formed as shown in FIG. 6b.

Figure 6C:
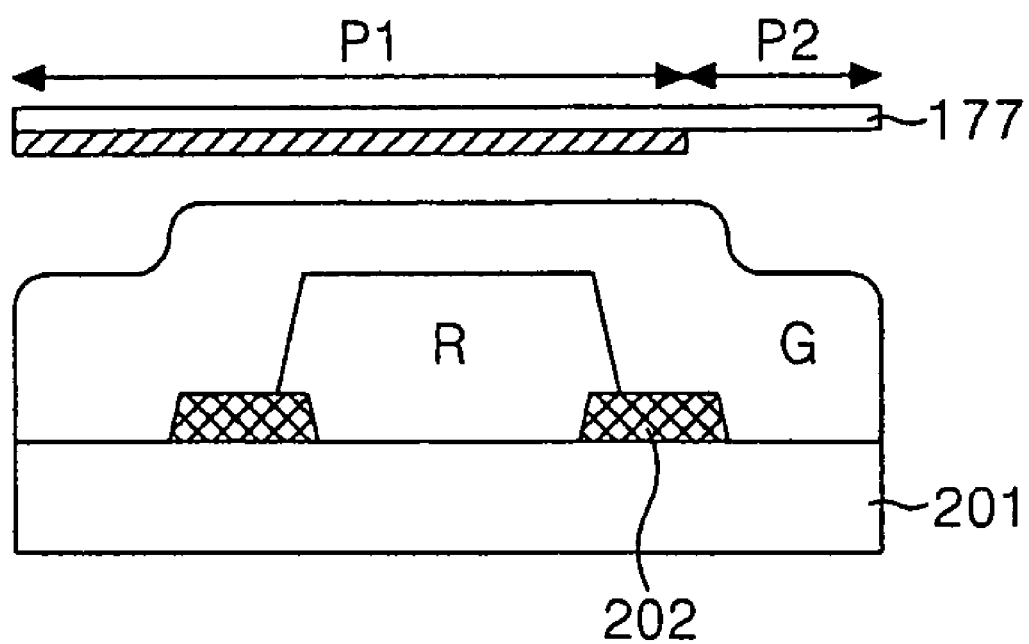
Figure 6D:
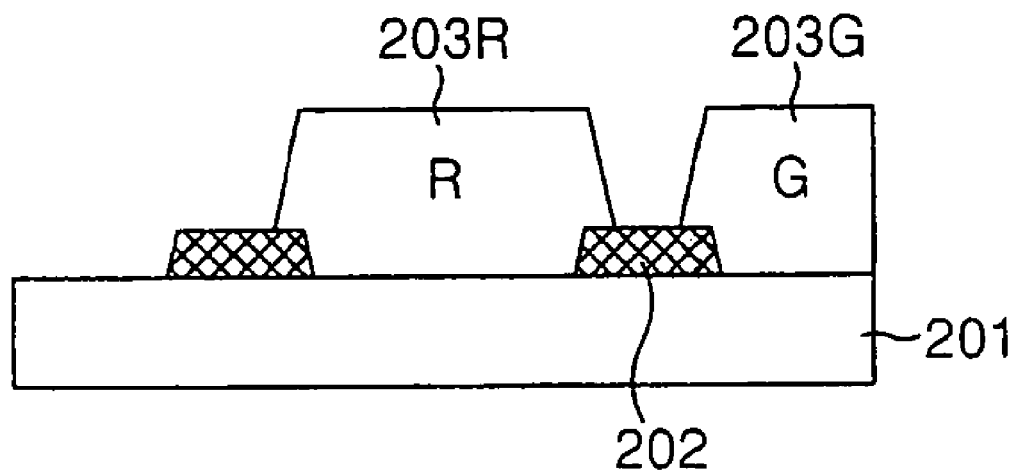

Referring to FIG. 6c, green resin (G) is deposited on the entire surface of the upper substrate 201 having the red color filter (203R) formed thereon. A mask 177 having a transmission part P2 and a shielding part P1 is aligned on the upper substrate 201 having the green resin (G) deposited thereon. Photolithography and etching processes using the mask 177 are applied to remove the portion of the green resin shielded from the light with the shielding part P1, and maintain the other portion of the green resin exposed to the light via the transmission part P2. As a result, a green color filter (203G) is formed as shown in FIG. 6d.

Figure 6E:
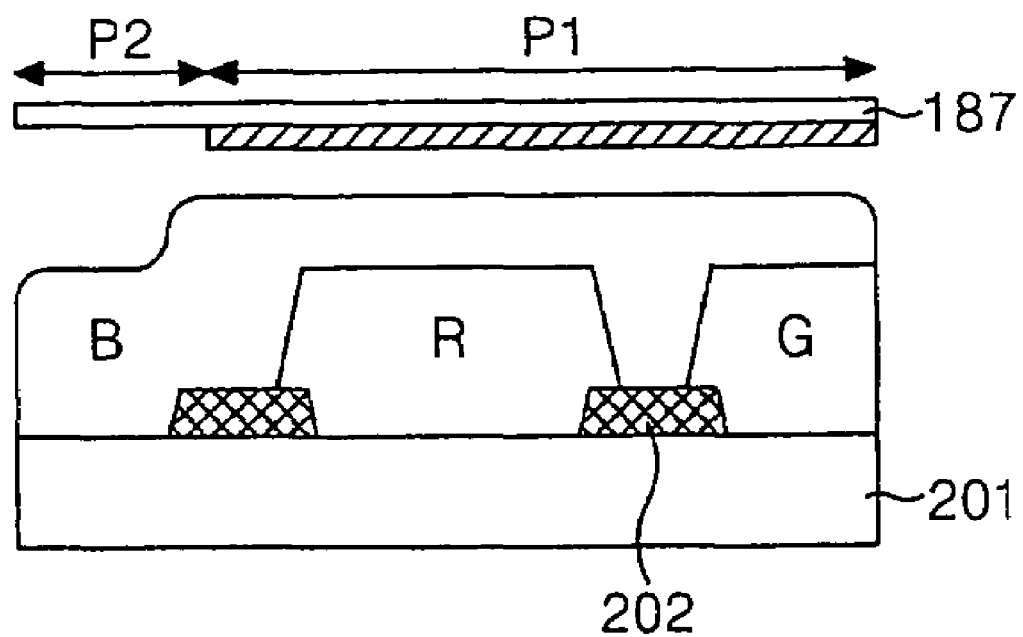
Figure 6F:
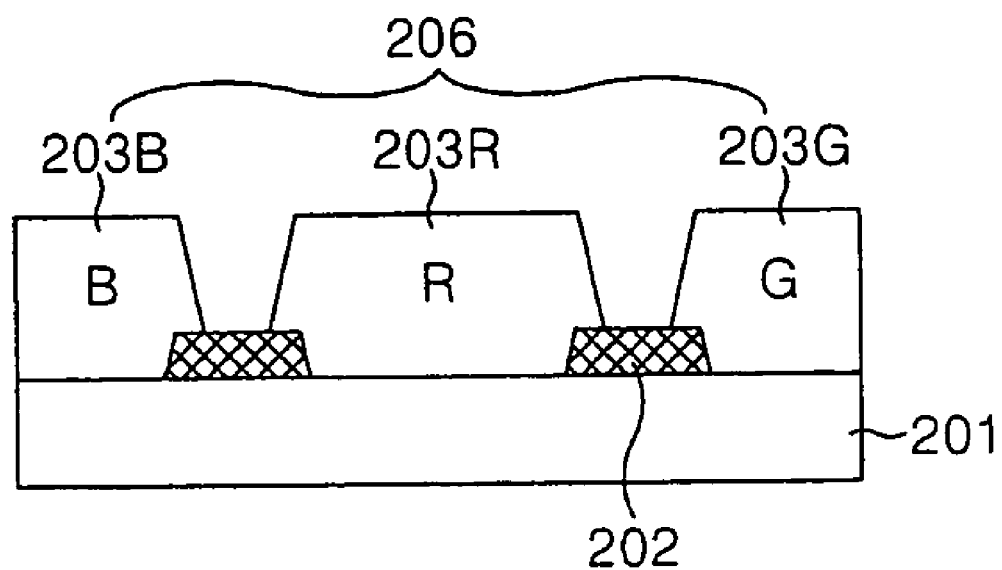

Referring to FIG. 6e, blue resin (B) is deposited on the entire surface of the upper substrate 201 having the green color filter (203G) formed thereon. A mask 187 having a transmission part P2 and a shielding part P1 is aligned on the upper substrate 201 having the blue resin (B) deposited thereon. Photolithography and etching processes using the mask 187 are applied to remove the portion of the blue resin shielded from the light with the shielding part P1, and maintain the other portion of the blue resin exposed to the light via the transmission part P2. As a result, a blue color filter (203B) is formed as shown in FIG. 6f.

Figure 6G:
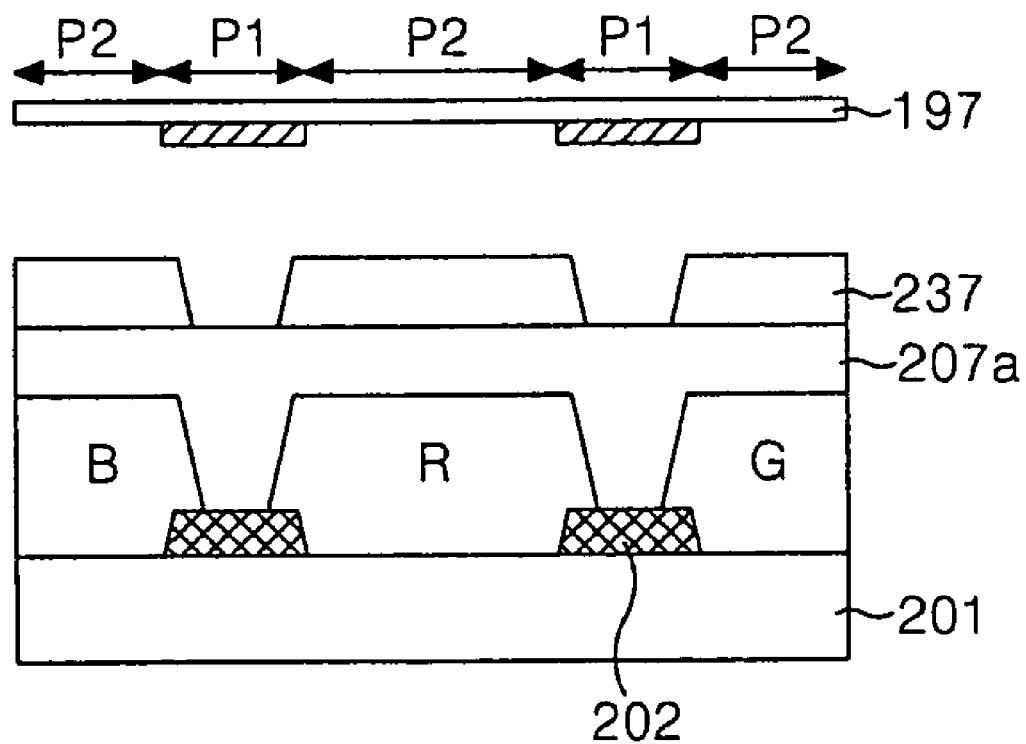
Figure 6H:
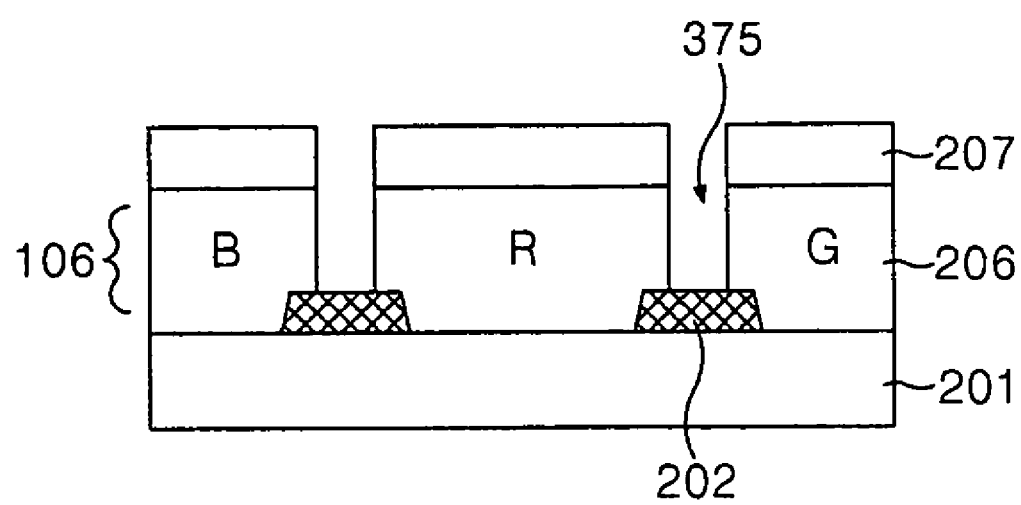
Figure 61:
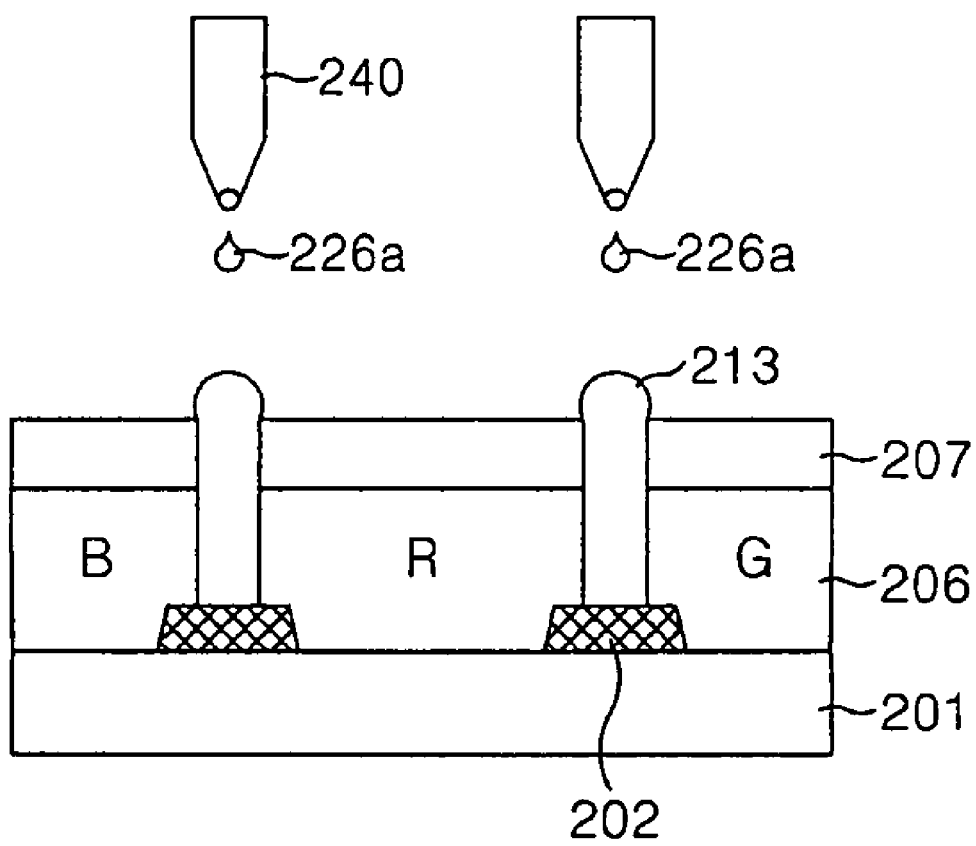

Referring to FIG. 6g, planarization material 207a and a photoresist are deposited in sequence on the upper substrate 201 having the R, G, B color filters (206) formed thereon. A mask 197 having a transmission part P2 and a shielding part P1 is aligned on the upper substrate 201. Photolithography and etching processes using the mask 197 are applied to remove the portion of the photoresist shielded from the light with the shielding part P1, and maintain the other portion of the photoresist exposed to the light via the transmission part P2. As a result, a photoresist pattern 237 is formed. Next, the planarization material 207a and the color filter 206 are patterned together through an etching process using the photoresist pattern 237 as a mask. Subsequently, as shown in FIG. 6h, a third through-hole 375 is formed to expose the black matrix.

Referring to FIG. 6i, an ink-jet device is used to form a spacer 213 by injecting the spacer material 226a to the third through-hole 375. Here, organic materials are used for the spacer material.

On the other hand, in the spacer formation as set forth above, before the injection of the spacer material, the application of a surface process using a gas of a fluorine compound to the penetrating holes and the exposed black matrixes causes the surfaces thereof to be hydrophobic and can facilitate the formation of the spacers.

As mentioned above, a fabricating method for the liquid crystal display panel according to the present invention forms holes penetrating the color filter and planarization layer, and forms the spacers at the holes using an ink-jet device. Therefore, the spacer material is injected only at desired locations, and the spacers are thus formed. The claimed method contributes to the elimination of the waste of the spacer material and the reduction of the material cost. Also, since the additional mask process for the pattern spacer becomes unnecessary, the number of steps in the manufacturing process can be reduced, and the fabricating costs can be lowered.

Although the present invention has been explained by the embodiments shown in the drawings described above, it should be understood that the invention is not limited to the embodiments, but rather that various changes or modifications thereof are possible without departing from the spirit and scope of the invention. Accordingly, the scope of the invention shall be determined only by the appended claims and their equivalents.

What is claimed is:

1. A liquid crystal display panel, comprising:
   a black matrix formed on a first substrate;
   a color filter having a first through-hole for exposing the black matrix to a region of the black matrix;
   a planarization layer having a second through-hole overlapped with the first through-hole; and
   a spacer formed in the first and second through-holes.

2. The liquid crystal display panel according to claim 1, wherein the spacer contacts the black matrix and extends away from the black matrix approximately 2~5 μm.

3. The liquid crystal display panel according to claim 1, wherein the first through-hole has a depth in the range of approximately 1~2 μm.

4. The liquid crystal display panel according to claim 3, wherein the first through-hole has a width in the range of approximately 10~70 μm.

5. The liquid crystal display panel according to claim 1, wherein a cross-sectional area of the second through-hole is greater than or equal to a cross-sectional area of the first through-hole.

6. The liquid crystal display panel according to claim 1, further comprising:
   a second substrate facing the first substrate;
   a pixel electrode formed on the second substrate; and
   a common electrode producing a horizontal electric field together with the pixel electrode.

7. The liquid crystal display panel according to claim 1, wherein the spacer is formed of an organic material.

8. The liquid crystal display panel according to claim 7, further comprising:
   an alignment layer covering the planarization layer and the spacer.

9. The liquid crystal display panel according to claim 8, wherein the spacer forms a bulge in the planarization layer.

10. A method of fabricating a liquid crystal display panel, comprising steps of:
   forming a black matrix on a first substrate;
   forming a color filter having a first through-hole for exposing the black matrix;

forming a planarization layer having a second through-hole overlapped with the first through-hole; and forming a spacer located in the first and second through-holes, overlapped with the black matrix.

11. The method of fabricating a liquid crystal display panel according to claim 10, wherein the spacer is projected from the planarization layer.

12. The method of fabricating a liquid crystal display panel according to claim 10, wherein the spacer has a thickness in the range of approximately 2~5 μm.

13. The method of fabricating a liquid crystal display panel according to claim 10, wherein the first through-hole has a depth in the range of approximately 1~2 μm.

14. The method of fabricating a liquid crystal display panel according to claim 13, wherein the first through-hole has a cross-sectional area in the range of approximately 10~70 μm.

15. The method of fabricating a liquid crystal display panel according to claim 11, wherein a cross-sectional area of the second through-hole is greater than or equal to a cross-sectional area of the first through-hole.

16. The method of fabricating a liquid crystal display panel according to claim 10, wherein the spacer is formed using an ink-jet method.

17. The method of fabricating a liquid crystal display panel according to claim 10, further comprising steps of:

forming a second substrate facing the first substrate;

forming a pixel electrode on the second substrate; and forming a common electrode for operating together with the pixel electrode to produce a horizontal electric field.

18. The method of fabricating a liquid crystal display panel according to claim 10, further comprising forming an alignment layer covering the planarization layer.

19. The method of fabricating a liquid crystal display panel according to claim 10, wherein the spacer is formed of an organic material.

20. A method of fabricating a liquid crystal display panel, comprising steps of:

forming a black matrix on a substrate;

forming a color filter on the substrate;

forming a planarization layer covering the color filter;

forming a through-hole penetrating both the color filter and the planarization layer to expose the black matrix; and forming a spacer located in the through-hole, overlapped with the black matrix, and projected from the planarization layer.

21. The method of fabricating a liquid crystal display panel according to claim 20, further comprising forming an alignment layer covering the planarization layer.

22. The method of fabricating a liquid crystal display panel according to claim 20, wherein the color filter is also formed partially over the black matrix.

23. The method of fabricating a liquid crystal display panel according to claim 20, wherein the spacer is formed of an organic material.

* * * * *